United States Patent Office 2,996,061
Patented Aug. 15, 1961

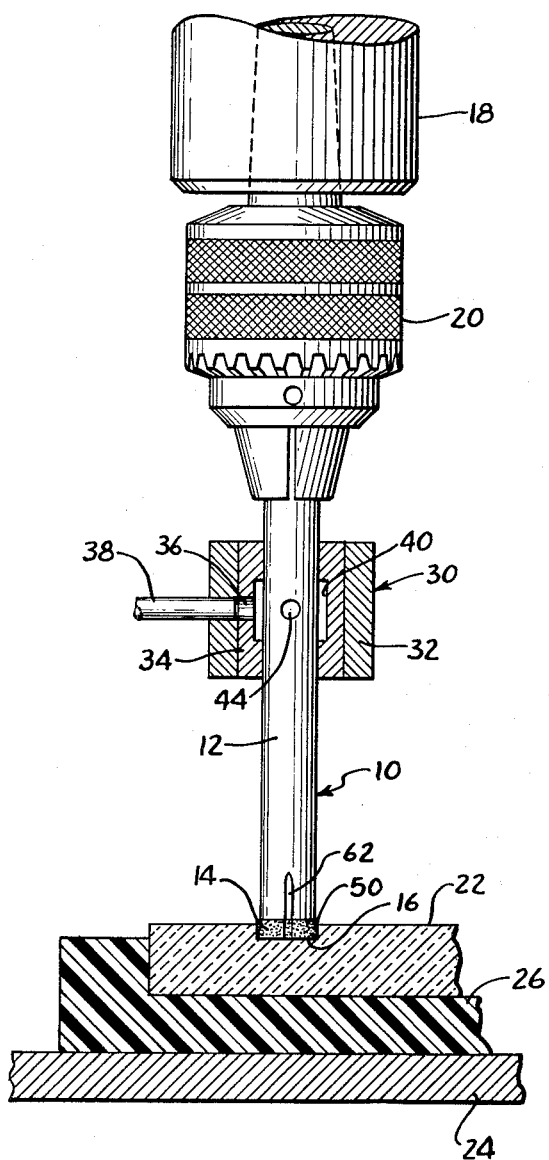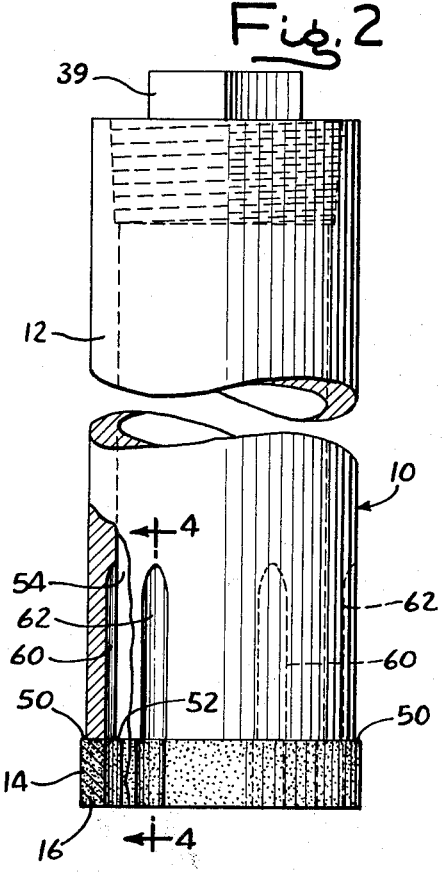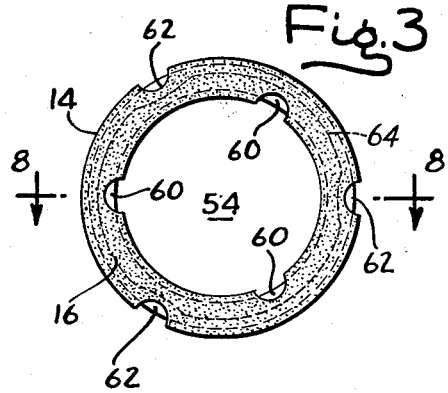

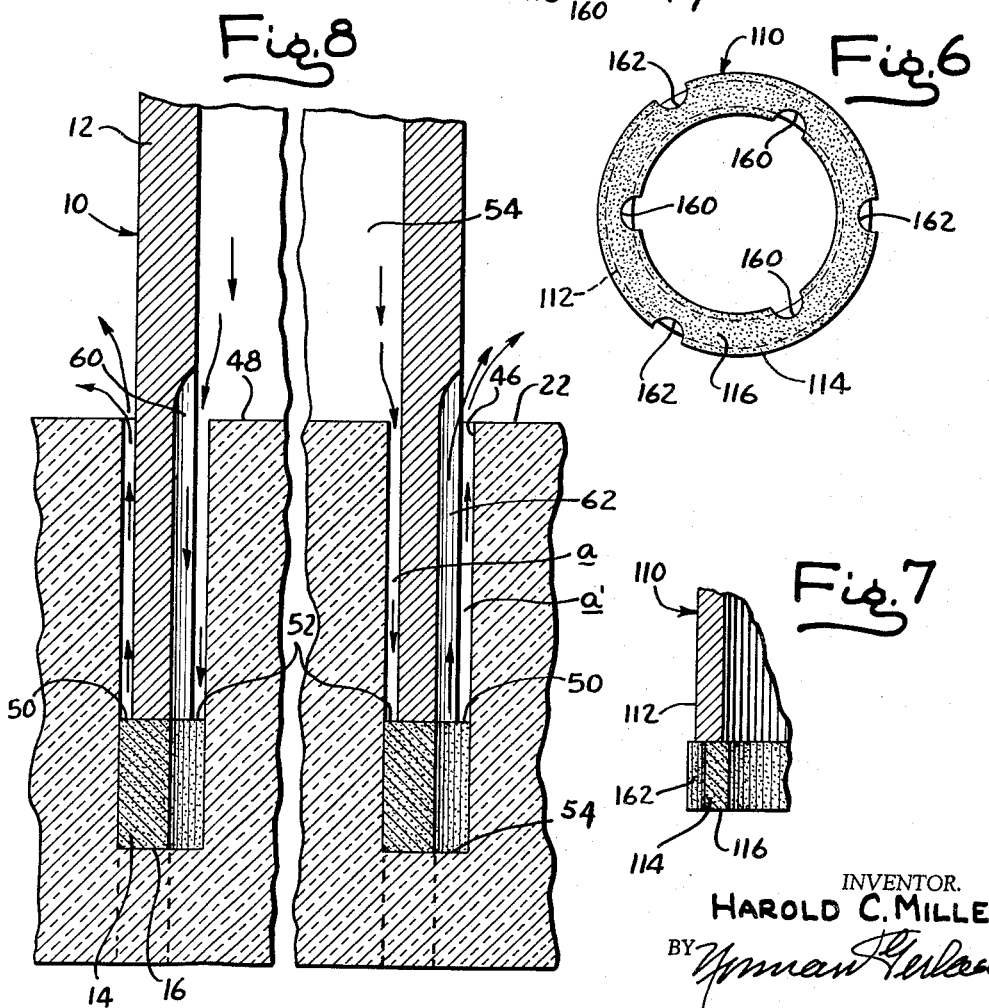

2,996,061
ABRASIVE DIAMOND CORE DRILL
Harold C. Miller, Chicago, Ill., assignor to Super-Cut, Inc., Chicago, Ill., a corporation of Illinois
Filed Jan. 26, 1959, Ser. No. 788,852
2 Claims. (Cl. 125—20)

The present invention relates to abrasive core drills and has particular reference to a novel form of tubular metal-diamond core drill for producing holes in a body of vitreous or ceramic material such as glass, tile, porcelain, cement, marble, Pyrex, tungsten carbide and the like.

Core drills constructed in accordance with the principles of the present invention will be found useful for forming holes or sockets in pieces of flat plate glass designed for use as doors, windows, automotive vehicle windshields, instrument dials and the like; for drilling holes or sockets in marble or other bathroom or kitchen appliances for the reception of pipes, rods and other fixtures; for drilling holes in cement floors or other objects for anchoring purposes; as well as for the production of holes in many other ceramic or vitreous articles too numerous to mention. The abrasive metal-diamond core drill of the present invention is also capable of functional uses other than in the production of holes and the same may, if desired, be employed without modification for producing cylindrical cores from the ceramic or vitreous material undergoing drilling, as, for example, in the production of glass perfume bottle stoppers or the like. Irrespective, however, of the particular use to which the present invention may be put, the essential features thereof are at all times preserved.

It is commonly known that in using a tubular core drill having a diamond-impregnated matrix at its operative cutting end affording a circular cutting edge, best results are obtained when a liquid coolant (usually water) is fed to the interior of the metal drill shank and thence to the cutting edge as this edge rotates in contact with the glass or other workpiece undergoing drilling. In such an operation, the coolant is constantly supplied under pressure to the interior of the shank so that the same may be forced downwardly through the shank and then radially outwardly around the cutting edge, assisted by the action of centrifugal force. The coolant, in thus passing beneath the cutting edge, performs its normal cooling function in the dissipation of heat of friction, while at the same time it operates to flush the loosened abrasive material and the drilled particles from the rotating cutting edge.

Heretofore, numerous limitations have been attendant upon the construction and use of a tubular metal-diamond core drill of the character briefly outlined above and principal among these is the tendency for the coolant to clog within and around the shank, particularly after an appreciable extent of drilling has taken place in any given drilling operation. Such clogging usually occurs after the core drill has descended into the workpiece undergoing drilling to such an extent that the annulus existing between the cylindrical outer side surface of the shank and the cylindrical surface of the surrounding socket has insufficient overall cross-sectional area to allow for free flow of the coolant upwardly and out of the socket undergoing creation. In other words, the progressive increase in surface area afforded by both the rotating core drill and the stationary cylindrical wall of the socket surrounding it, sets up a resistance to free coolant flow which ultimately becomes so great as to prevent egress of the coolant from the socket. This tendency of the coolant to clog within the hole or socket undergoing drilling is also enhanced to a certain extent by the progressively increasing surface area afforded by the cylindrical inner side surface of the rotating drill shank and the cylindrical side surface of the stationary core which it surrounds.

Efforts to overcome the above-noted limitations in the construction and use of conventional tubular metal-diamond core drills have not proven altogether satisfactory. For example, it has been proposed that the annular cutting edge of the drill be interrupted by the provision of radial slots in the operative end of the drill, or by forming the diamond impregnated matrix in arcuate segments which are circumferentially spaced from each other, or by otherwise, in effect, creating a series of radial slots in the cutting edge, such slots being intended to increase the flow of the coolant fluid around the extreme forward cutting edge of the drill. While such slots have to a certain extent decreased the cutting time required for any given depth of non-slotted or continuous annular cutting edges, it has been found that up until the time slots become fully embedded in the material undergoing drilling to the full height of the slots, such slots afford pressure-release areas through which the coolant may rapidly escape, thus appreciably decreasing the pressure of the coolant within the shank so that insufficient fluid pressure is present to force the coolant beneath the rotating intervening abrasive segments. Furthermore, as the drill descends into the material undergoing drilling to such an extent that the slots do become fully encompassed by the material, only a brief period of effective drilling operations will take place inasmuch as further descent of the tool into the material will set up the same restriction to reentrant coolant flow within the outer fluid annulus that is present in connection with the use of non-slotted or non-segmental diamond impregnated matrices.

The present invention is designed to overcome the above-noted limitations that are attendant upon the construction and use of conventional core drills of the non-slotted or slotted types, and toward this end, there is contemplated the provision of a novel form of tubular metal-diamond core drill which, during use and throughout the full descent of the drill from the time of the initial contact of the rotating cutting edge thereof with the workpiece undergoing drilling, to the time of "break through," will, firstly, maintain adequate fluid pressure within the shank in order positively to force the coolant around the working end of the drill for cooling and flushing purposes as outlined above; secondly, relieve frictional opposition to the reentrant column of coolant and to the loosened drilled particles entrained therein so that there will be no tendency for the coolant to clog within the reentrant annulus; thirdly, relieve to a certain extent the frictional opposition to the particle-free coolant within the inner fluid path or annulus surrounding the stationary core and leading directly to the rotating cutting edge; and fourthly, otherwise maintain an effective course for the flow of the coolant from the coolant source through the hollow shank and around the rotating cutting edge during the entire drilling operation.

The provision of a tubular metal-diamond core drill of the character set forth above being among the principal objects of the invention, it is another and important object to provide a core drill having associated therewith certain pressure-relief areas which will allow extremely free flow of the coolant and the entrained drilled particles, yet do not appreciably weaken the drill nor appreciably shorten its effective life under the influence of normal wear, but which, on the other hand, actually increase the operative life of the drill by the effective flushing action thereof, as will be described presently.

The above-mentioned objects are ancillary to or in furtherance of the paramount object of the invention which is, namely, to provide an improved tubular metal-diamond core drill which will effectively drill through or into a given ceramic, vitreous or similar object at an appreciably greater rate of speed than has heretofore been possible with conventional core drills designed for the same purpose.

Numerous other objects and advantages of the invention, not at this time enumerated, will become more readily apparent as the following description ensues.

In the accompanying two sheets of drawings forming a part of this specification, two illustrative embodiments of the invention have been shown.

In this drawing

FIG. 1 is a front elevational view of a portion of a drill press showing a preferred form of abrasive diamond core drill constructed in accordance with the principles of the present invention operatively mounted therein;

FIG. 2 is an enlarged fragmentary side elevational view of the operative end region of the core drill shown in FIG. 1;

FIG. 3 is an end elevational view of the drill shown in FIG. 2;

FIG. 4 is a sectional view taken substantially along the line 4—4 of FIG. 2;

FIG. 5 is a side elevational view similar to FIG. 2 showing a modified form of abrasive diamond core drill;

FIG. 6 is an end elevational view of the drill shown in FIG. 5;

FIG. 7 is a sectional view taken substantially along the line 7—7 of FIG. 5; and FIG. 8 is a fragmentary sectional view taken substantially centrally and longitudinally through the core drill of FIG. 1 showing the same in operative relation to a piece of flat plate glass which is undergoing drilling, and illustrating the flow of coolant in and around the core drill.

Referring now to the drawings in detail and in particular to FIG. 1, a preferred form of core drill constructed according to the present invention has been designated in its entirety at 10. The drill 10 is of the type commonly referred to as a tube drill, such a drill ordinarily being made up of a thin-walled metal tube, carrying a diamond impregnated cutting portion or annulus at its lower end. Accordingly, the core drill 10 is in the form of an assembly including a cylindrical shank 12 which preferably is in the form of a seamless steel tube, to the lower end of which there is affixed a diamond impregnated cutting annulus 14, the bottom surface or rim 16 of which is adapted to engage a ceramic or other workpiece which is to be drilled. Rotary movement of the core drill for drilling purposes may be imparted to the drill by various means, an ordinary electrically powered drill press, a portion of which has been shown at 18, being suitable for this purpose. Accordingly, for illustrative purposes herein, the upper end of the shank 12 is shown as being operatively mounted in, and the drill driven by, a chuck 20 associated with the drill press 18. The workpiece 22, which for illustrative purposes herein, is shown as being in the form of a piece of flat plate glass, is operatively supported above the bed plate 24 of the drill press 18 by means of a suitable backing or supporting plate 26.

Means are provided for feeding a coolant, such as water, into the interior of the hollow shank 12 under pressure. Such means may consist of a sleeve assembly 30 including a hollow open-ended tubular casing 32 having an internal liner 34 which may be formed of a suitable plastic anti-friction material, as, for example, the polyethylene polymer known as Teflon. An inlet passage 36 for the coolant extends through the casing 32 and liner 34 and is designed for connection to a suitable conduit 38 leading to a coolant source (not shown). The inlet passage 36 is in register with an annular relieved area 40 provided in the liner (see also FIG. 2) and the shank 12 is provided with one or more openings 44 in the wall of the shank whereby fluid may enter the interior of the shank for purposes that will be made clear presently. The upper end of the shank may be closed by any suitable means, such as a plug 39. The specific means disclosed herein for supplying a coolant to the interior of the core drill is purely exemplary and no claim is made herein to any novelty in connection with the same, the novelty of the present invention residing rather in the construction of the core drill, particularly in regard to the operative cutting end thereof.

In FIG. 8, the abrasive diamond core drill 10 is shown as being in the process of drilling a hole in the plate glass workpiece 22, the rotating annular abrasive annulus 14 serving progressively to form an annular socket 46 in the workpiece 22 and which socket surrounds a central glass core 48 which, as the core drill descends into the glass, progressively increases in length until such time as the bottom surface or rim 16 of the annulus passes completely through the workpiece, at which time the core 48 is severed from the body of the glass workpiece 22 in the form of a cylindrical glass slug or core, the outlines of which are completed by the dotted lines in FIG. 8. In conventional core drills, and also in connection with the present core drill, the coolant which is fed into the interior of the tubular shank 12 flows downwardly through the annular space designated at $a$ existing between the inner side surface of the tubular shank and the core 48 and passes around the bottom surface or rim 16 of the abrasive annulus 14, from whence it follows a reentrant path through the outside annulus $a'$ existing between the outer side surface of the shank 12 and the surrounding cylindrical surface of the hole or socket 46.

Referring now to FIGS. 2, 3 and 4, the radial width or thickness of the abrasive annulus 14 is slightly greater than the radial width or thickness of the tubular or cylindrical wall of the metal shank 12 so that relatively narrow upwardly facing shoulders 50 and 52 exist on the top or upper surface of the abrasive annulus 14 on the outside and the inside respectively of the tubular wall of the shank 12. This additional radial thickness of the abrasive annulus 14 serves to create the previously described two narrow annular spaces $a'$ and $a$, respectively, during descent of the core drill into the workpiece 22.

It has been set forth previously in the statement of the invention that with conventional diamond core drills embodying only the shape characteristics thus far described, considerable difficulty has been encountered in forcing the coolant fluid downwardly through the inner annular space $a$, around the bottom surface or rim 16 of the abrasive annulus, and upwardly through the outer annular space $a'$. This has been due to the ever increasing cylindrical frictional surface areas which are presented to the flowing coolant within the annulae where the wall-to-wall clearances do not exceed a few thousandths of an inch, as well as to the extremely small clearance which exists between the bottom surface 16 of the abrasive annulus and the receding bottom wall 54 of the annular socket 46, this latter clearance being of indefinite extent and existing solely by virtue of the flushing action of the coolant as the same washes away the loosened drilled particles. Where conventional means for relieving the frictional resistance or drag offered to the coolant as, for example, the provision of radial slots in the bottom surface or rim 16 of the abrasive annulus 14, has been resorted to, the out-rush of fluid through these slots prior to the time that the core drill has descended into the workpiece to a depth sufficient to cover the slots relieves the pressure within the shank 10 to such an extent that the coolant is merely "wiped" under the bottom surface of the rim of the abrasive annulus 14 rather than being positively forced thereunder.

According to the present invention, in the form thereof shown in FIGS. 1 to 4, inclusive, the cylindrical inner side surface of the core drill assembly (shank and annulus) is formed with a series of circumferentially and preferably equally spaced vertically extending elongated internal grooves 60 which are preferably, but not necessarily, semi-circular in transverse cross section. Similarly, the cylindrical outer side surface of the core drill assembly is formed with a series of spaced elongated vertically extending external grooves 62. The grooves 60 and 62 are preferably staggered circumferentially as shown clearly in FIG. 3. While three such grooves 60 and three such grooves 62 have been illustrated herein, it will be understood that a greater or a lesser number of these grooves may be employed if desired. In general, the specific number of grooves 60 and 62 will be a function of the diameter and wall thickness of the composite tubular tool assembly, the larger the tool, the greater the number of grooves which may be employed. In the core drill of FIGS. 1 to 4, the portions of the grooves in the shank are in the nature of continuations of the portions of the grooves that are formed in the inner and outer side surfaces of the annulus 14.

The purpose of the grooves 60 on the inside face of the core drill is to provide a series of low friction paths for the flow of coolant downwardly in the shank 12 through the inner annular space $a$ alongside the core 48 and past the abrasive annulus 14 so that the coolant may reach the rim region 16 of the annulus in sufficient volume and at sufficient internal pressure that it will efficiently perform its cooling, lubricating and flushing action as previously described. The grooves 62 in the outer side surface of the tubular core drill serve a similar purpose and they provide a series of low friction paths for the reentrant flow of coolant fluid upwardly in the annular space $a'$. Since the grooves 62 follow a circular path of motion during rotation of the core drill bodily about its axis, they operate somewhat in the manner of impeller vanes to create a certain amount of turbulence in the outer annular space $a'$, such turbulence serving to loosen or dislodge any oversize particles of flushings which may be loosened from the workpiece undergoing drilling, or from the abrasive annulus 14, and become wedged between the opposed walls of the annular space $a'$. This latter feature may be important where the drilling of materials of varying localized hardness such as granular substances, for example, sandstone, is concerned.

The specific shape and size of the grooves 60 and 62 are not critical as far as efficient pressure reduction within the two annular spaces $a$ and $a'$ is concerned. The size and shape thereof insofar as affording maximum wear life to the core drill is concerned are critical. In either event, it is obvious that the longitudinal extent of the grooves 60 and 62 should be at least equal to the depth of cut which is to be made into the workpiece 22 undergoing drilling. For maximum core drill life coupled with maximum groove efficiency, the depth of the grooves 60 and 62 will be no less than one-half the wall thickness of the abrasive annulus 14. For convenience of manufacture, the grooves 60 and 62 are arcuate or semi-cylindrical in cross section. Due to the slight increase in wall thickness of the abrasive annulus 14, the groove depth is slightly greater within the annulus than it is within the shank wall, although the extreme bottom of the grooves 60 and 62 are uninterruptedly continuous. Under certain circumstances, the maximum groove depth may slightly exceed one-half the wall thickness of the annulus 14 without impairing core drill life. Core drills of this general character are known to wear slightly at the cylindrical surfaces although no actual positive outward or inward radial increments of pressure are applied to the cylindrical surfaces of the socket 46 or core 48, respectively. This overall wear, particularly on the outer side surface of the core drill, is a result of the presence of free floating drilled particles within the annular spaces $a$ and $a'$. Due to the fact that the internal regions of the grooves 62 are more remote from the wall of the socket 46 undergoing creation, abrasive forces on the groove walls, especially near the bottom regions of the grooves, will be less than they are in the outer cylindrical regions of the shank 12. Thus, a slight excess in depth of the grooves 62 beyond the aforementioned limit of one-half the thickness of the annulus 14 may not result in a complete breakthrough of the groove before the shank wall has become worn to a critical degree of thinness. It is considered that an ideal groove depth of 55% of the annulus thickness will, due to the frictional equalization phenomena described above, result in maximum core drill life. For convenience of manufacture, a satisfactory long-wearing core drill will result if the depth of the grooves 60 and 62 is made equal, throughout the entire length of the grooves, to one-half the radial thickness of the abrasive annulus 14.

It is to be noted at this point and by reference to FIG. 3 that the lower end face of the abrasive annulus is uninterruptedly continuously flat. In other words, there is no free fluid passage across this bottom end face 16. The outer rim and the inner rim of the annulus may be said to be interrupted by the presence of the grooves 60 and 62, but the continuity of the annulus is not interrupted and it presents a completely closed flat annulus which may be said to be wavy or sinuous in a circumferential direction in that the locus of a point sweeping around the annulus midway between the inner and outer edges of the annulus is generally of serpentine or sinuous configuration as shown by the dotted line 64 in FIG. 3.

In the form of the invention shown in FIGS. 5, 6 and 7, the general organization of the composite core drill 110 remains substantially the same as in the form of the invention described above and illustrated in FIGS. 1 to 4, inclusive, and 8. To avoid needless repetition of description, similar reference numerals but of a higher order have been applied to the corresponding parts in FIGS. 5, 6 and 7.

In this latter form of the invention, the internal grooves 160 and the external grooves 162 traverse the inner and outer side surfaces of the abrasive annulus 114 respectively, but they do not extend upwardly into the wall of the tool shank 112. Abrasive diamond core drills of this character may be found useful where relatively large size drills are concerned and where the radial widths of the annular spaces $a$ and $a'$ (FIG. 8) are relatively large due to the increased overhang at the shoulders 50 and 52. The operation of the core drill 110 is substantially the same as the operation of the core drill 10 previously described.

While two specific forms of core drills constructed in accordance with the principles of the present invention and involving the novel principles of operation set forth above have been illustrated in the drawings and described in this specification, it will be understood that these forms of core drills do not by any means indicate the only forms suitable for the abrasive phenomena involved. The forms illustrated herein are only two such forms which have been developed for commercial application.

The invention is not to be interpreted as being limited to the details described since these may be modified within the scope of the appended claims without departing from the spirit and scope of the invention.

Having thus described the invention what I claim as new and desire to secure by Letters Patent is:

1. A composite rotary tubular abrasive diamond core drill adapted during normal use to extend vertically and be rotated about its axis and comprising a cylindrical tubular shank of uniform wall thickness and with passage means whereby a coolant may be introduced under pressure to the interior thereof for downward flow therethrough, and an abrasive annulus in the form of a diamond impregnated matrix fixedly secured to the lower end of the shank in axial alignment and fluid communication therewith, said annulus having substantially cylindrical inner and outer side surfaces and a continuous uninterrupted bottom surface, said core drill being adapted, during a drilling operation, to descend endwise and axially into a workpiece and create progressively therein an upstanding central cylindrical core surrounded by an annular socket with the bottom surface of the rotating annulus abrasively engaging the bottom wall of the socket, the radial thickness of said abrasive annulus being slightly greater than the wall thickness of the shank with the annulus overhanging the inner and outer side surfaces of the shank radially in opposite directions respectively whereby, upon such descent of the core drill, relatively thin inner and outer annular clearance spaces will be progressively formed in the workpiece in the immediate vicinity of the shank for the flow of coolant downwardly alongside the inner side surface of the shank and for the reentrant upward flow of coolant alongside the outer side surface of the shank after passage of the coolant radially outwardly between the rotating bottom surface of the abrasive annulus and the bottom wall of the socket, the inner and outer side surfaces of the abrasive annulus being each formed with a series of circumferentially spaced, vertically extending grooves therein, each groove completely spanning the vertical height of the abrasive annulus and having its maximum depth equal to approximately 55% of the radial thickness of the abrasive annulus, the grooves in the inner side surface of said abrasive annulus being radially staggered with respect to the grooves in the outer side surface of the annulus so that upon rotation of the core drill when in contact with the workpiece, all points undergoing abrasion by reason of their contact with said bottom surface of the abrasive annulus will be repeatedly uncovered by the lower ends of at least one of said series of vertically extending grooves and thereby flooded with the coolant flowing downwardly through such grooves, and so that upon normal wear of said inner and outer side surfaces of the abrasive annulus, the grooves provided therein will remain effective until such time as such side surfaces assume the inner and outer radial dimensions of the cylindrical tubular shank.

2. A composite rotary tubular abrasive diamond core drill adapted during normal use to extend vertically and be rotated about its axis and comprising a cylindrical tubular shank of uniform wall thickness and with passage means whereby a coolant may be introduced under pressure to the interior thereof for downward flow therethrough, and an abrasive annulus in the form of a diamond impregnated matrix fixedly secured to the lower end of the shank in axial alignment and fluid communication therewith, said annulus having substantially cylindrical inner and outer side surfaces and a continuous uninterrupted bottom surface, said core drill being adapted, during a drilling operation, to descend endwise and axially into a workpiece and create progressively therein an upstanding central cylindrical core surrounded by an annular socket with the bottom surface of the rotating annulus abrasively engaging the bottom wall of the socket, the radial thickness of said abrasive annulus being slightly greater than the wall thickness of the shank with the annulus overhanging the inner and outer side surfaces of the shank radially in opposite directions respectively whereby, upon such descent of the core drill, relatively thin inner and outer annular clearance spaces will be progressively formed in the workpiece in the immediate vicinity of the shank for the flow of coolant downwardly alongside the inner side surface of the shank and for the reentrant upward flow of coolant alongside the outer side surface of the shank after passage of the coolant radially outwardly between the rotating bottom surface of the abrasive annulus and the bottom wall of the socket, the inner and outer side surfaces of the abrasive annulus being each formed with a series of circumferentially spaced, vertically extending grooves therein, each groove completely spanning the vertical height of the abrasive annulus and having its maximum depth no less than one-half the radial thickness of the abrasive annulus, the grooves in the inner side surface of said abrasive annulus being radially staggered with respect to the grooves in the outer side surface of the annulus so that upon rotation of the core drill when in contact with the workpiece, all points undergoing abrasion by reason of their contact with said bottom surface of the abrasive annulus will be repeatedly uncovered by the lower ends of at least one of said series of vertically extending grooves and thereby flooded with the coolant flowing downwardly through such grooves, and so that upon normal wear of said inner and outer side surfaces of the abrasive annulus the grooves provided therein will remain effective until such time as such surfaces assume the inner and outer radial dimensions of the cylindrical tubular shank, the lower end of said shank being provided in its inner and outer side surfaces with upward continuations of the grooves in the inner and outer side surfaces of the abrasive annulus, each groove in the annulus and its associated continuation in the shank having a combined height at least equal to the thickness of the workpiece undergoing drilling.

References Cited in the file of this patent

UNITED STATES PATENTS

| | | |
|---|---|---|
| 1,806,079 | Mitchell | May 19, 1931 |
| 1,912,854 | Osgood | June 6, 1933 |
| 2,588,267 | McLaughlin | Mar. 4, 1952 |
| 2,644,672 | Matthews | July 7, 1953 |
| 2,708,104 | McAllister | May 10, 1955 |

FOREIGN PATENTS

| | | |
|---|---|---|
| 117,025 | Sweden | Aug. 13, 1946 |